(No Model.)
C. W. GILLIS.
GATE.
No. 338,058. Patented Mar. 16, 1886.
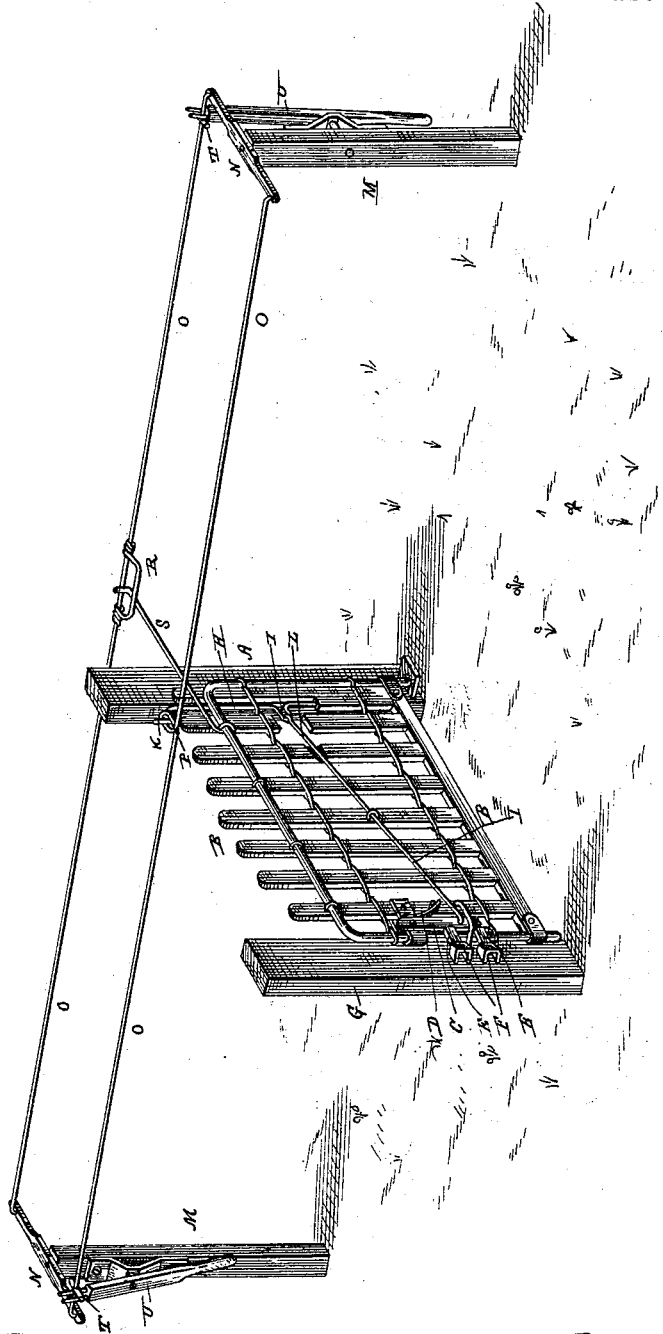
Witnesses.
Chas. A. Davis
Percy White
Inventor.
C. W. Gillis
By C. M. Alexander
his Attorney.

UNITED STATES PATENT OFFICE.

CYRUS W. GILLIS, OF SAN ANTONIO, TEXAS.

GATE.

SPECIFICATION forming part of Letters Patent No. 338,058, dated March 16, 1886.

Application filed July 2, 1885. Serial No. 170,516. (No model.)

*To all whom it may concern:*

Be it known that I, CYRUS W. GILLIS, a citizen of the United States, residing at San Antonio, in the county of Bexar and State of Texas, have invented certain new and useful Improvements in Gates, of which the following is a specification, reference being had therein to the accompanying drawing.

My invention relates to improvements in gates, and is designed to produce a device whereby the gate may be opened or shut from a distance, that shall be of such simple construction as shall admit of repair, should it become damaged, at a small expense.

The improvement consists, essentially, in the construction as claimed.

The drawing is a perspective view of the gate closed.

The main post A has hinged to it in any approved manner a swinging gate, B, made in such form as to be light, and therefore easily manipulated.

The gate is provided with a pivoted latch, C, retained in its normal position by a spring, D, and provided with projections or arms E, which, when the gate is closed, engage under loops or staples F on the abutting post G, placed across the roadway from the main post A. Near the hinged portion of the gate, and having proper bearings in said gate, is a vertical shaft, H, with a crank, I, about midway, and having its upper end extending above the top of the gate, where it is formed into a crank, K. From the crank I to the latch, which is pivoted to swing laterally, passes a rod, L, so that when the shaft turns the latch will be swung away from the loops F, and thus disengaged therefrom. On the side of the roadway, on a line with and at any convenient distance from the main post, are posts M—one on each side thereof—carrying on their tops, pivoted centrally, arms N, the pivot allowing a horizontal swing. The respective ends of these arms are connected by rods or wires O, one being provided with a loop, P, engaging with the crank K, and the other with an extended loop, R. From the gate rearward extends an arm, S, with an upturned free end engaging within the loop R.

On each rod O, near one end, is a stop, T, against which engages one end of a vertical lever, U, pivoted to the side of the post M. As one of the levers is moved, it causes the wires to move in opposite directions. The one connected to the crank K will cause the rock-shaft to turn, unlatching the gate, before the loop R is engaged with the free end of the arm S. When the gate has been unlatched, the loop R engages against the said arm, causing the gate to be swung open. By reversing the operation the gate is closed.

The parts are all of simple construction, and easily replaced, if broken.

I claim—

The combination, with a swinging gate provided with a rearwardly-extending arm and a pivoted latch, of a crank-shaft journaled in said gate and connected to said latch, and an operating mechanism consisting of pivoted arms on supporting-posts, rods or wires provided with loops and connecting the arms, one loop engaging with the rearward gate-arm and the other loop with the crank-shaft, and levers operating to give a longitudinal movement to the wires, substantially as and for the purpose specified.

In testimony whereof I affix my signature in presence of two witnesses.

CYRUS W. GILLIS.

Witnesses:
    D. M. POOR,
    GEO. H. JUDSON.